Figure 1:
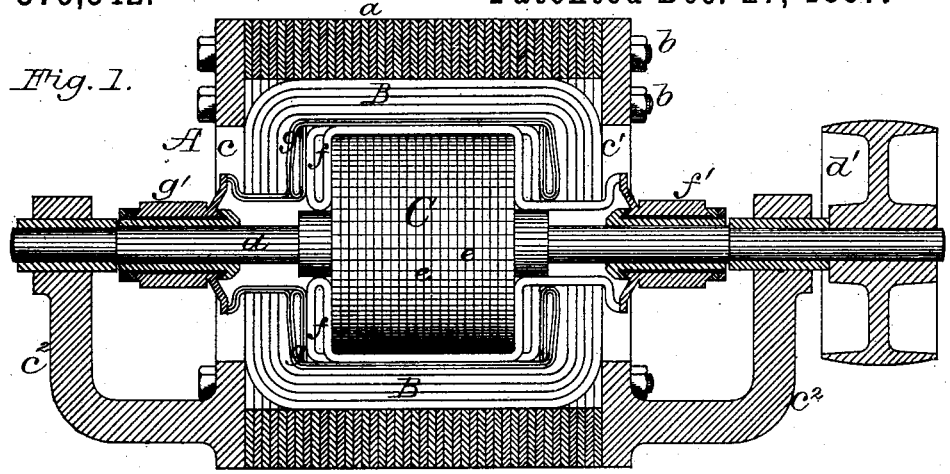

(No Model.)

R. EICKEMEYER.
ELECTRICAL CONVERTER, MOTOR, AND GENERATOR.

No. 375,542. Patented Dec. 27, 1887.

Attest:
Philip F. Larner
Howell Bartle

Inventor:
Rudolf Eickemeyer
By ——— Attorney

UNITED STATES PATENT OFFICE.

RUDOLF EICKEMEYER, OF YONKERS, NEW YORK.

ELECTRICAL CONVERTER, MOTOR, AND GENERATOR.

SPECIFICATION forming part of Letters Patent No. 375,542, dated December 27, 1887.

Application filed August 10, 1887. Serial No. 246,605. (No model.)

*To all whom it may concern:*

Be it known that I, RUDOLF EICKEMEYER, of Yonkers, in the county of Westchester and State of New York, have invented certain new and useful Improvements in Electrical Converters, Motors, and Generators; and I do hereby declare that the following specification, taken in connection with the drawings furnished and forming a part of the same, is a clear, true, and complete description of my invention.

The prime object of my invention is to convert electrical currents of one potential into currents of a higher or lower potential, whether said currents be of the alternating or the continuous variety. In attaining these ends I employ in part features heretofore devised by me and disclosed in my United States Letters Patent No. 358,340, dated February 22, 1887. I have discovered if an armature having a core of magnetic metal and carrying independent coils or windings suitable for a converter be organized with an exciting-helix and an inclosing-shell arranged, as disclosed in my said Letters Patent, so that said helix will directly polarize the armature, and the shell inclose said helix and armature, that specially valuable results will accrue in the conversion of electrical currents of one potentiality to those of another. I have also found that such a magnetic circuit as is specially illustrated in Figs. 15 and 16 of the drawings of said patent affords unusually rapid changes in magnetism, because of the employment of an armature containing magnetic metal, an exciting-helix which directly polarizes said armature and surrounds it diametrically, and a shell which is composed of iron plates and incloses the helix and armature, and these have now been organized by me into an electrical current-converter and accompanied with features in combination therewith as have been devised and employed by me with special reference to attaining the above-stated results.

In operating my machines devised for performing the special service indicated I have found that they are capable of a wide range of duty, in that they can be operated solely as converters, or converters and motors, or motors and generators.

After describing machines embodying my invention, as illustrated in the drawings herewith, the features deemed novel will be specified in the several clauses of claim hereunto annexed.

Figure 2:
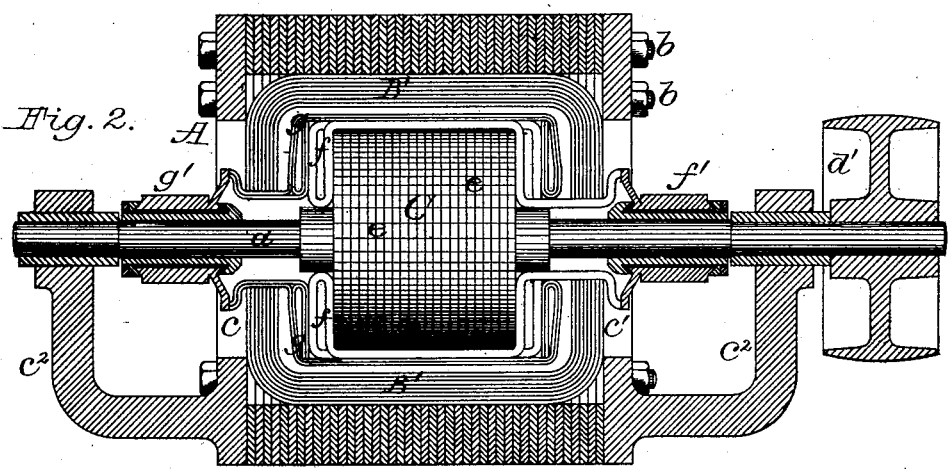
Figure 3:
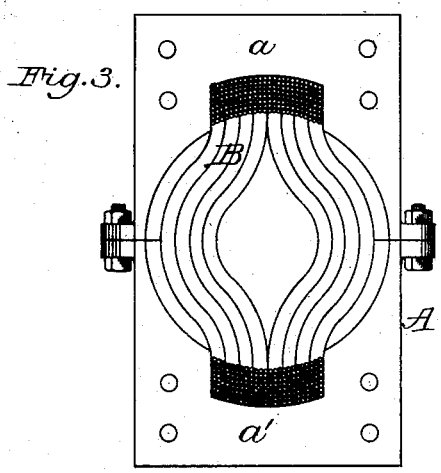
Figure 4:
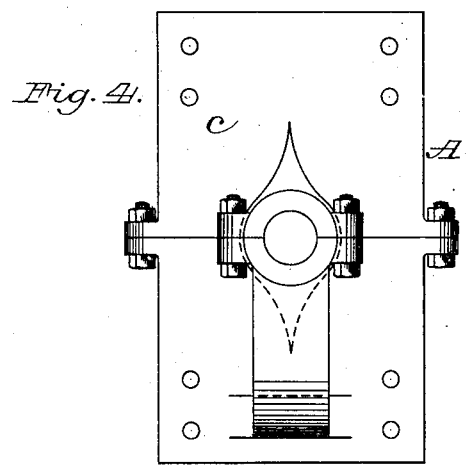

Referring to the drawings, Figure 1 illustrates in longitudinal vertical section a converter and motor embodying my invention as organized for converting low potential currents into those of high potential. Fig. 2 in like manner illustrates a similar machine as organized for converting high potential currents into those of low potential. Fig. 3 illustrates the laminated casing or shell of either of said two machines in end view, the adjacent head being removed, and it also shows the end of such an exciting-helix as is shown in Fig. 1. Fig. 4 is an end view of either of said two machines.

The magnetic shell A here shown is a laminated internally-cylindrical structure, and it embodies a series of soft-iron plates, $a$ $a'$, respectively, at the upper and lower sides, and these have an internal contour affording the armature-chamber and also a chamber for the reception of the exciting helix or helices B or B', said plates being secured in place by a series of longitudinal rods or bolts, $b$, extending through holes therein and locked by means of nuts to the heads $c$ $c'$. Each of said heads is composed of two parts, an upper and a lower, the latter affording brackets $c^2$, on or in which the bearings are mounted for the shaft $d$ of the armature C. The armature-core is also laminated, being composed of a series of disks, $e$, composed of soft magnetic metal.

The description thus far given is applicable to both forms of machine shown, and it relates to features which are substantially as were disclosed in my aforesaid Letters Patent. Now, referring to Fig. 1, it will be observed that the exciting-helix B is composed of coarse or heavy wire, and that the armature carries two sets of windings, $f$ and $g$, and appropriate commutators, $f'$ and $g'$, at opposite ends of the machine.

The inner armature coils or winding, $f$, is composed of layers of coarse wire, and the outer coils or winding, $g$, is composed of layers of fine wire. This machine is organized for converting low-potential currents into high potential, and in thus operating a low-potential current from an electric generator is applied by one of the usual brushes to the commutator $f'$ and through the coarse winding $g$, and from a second brush through helix B, the machine then operating as a motor run in series, the armature-shaft being provided with a belt-pulley, $d'$. The revolving motion of the armature develops a current in the outer coil or winding, $g$, which, being materially finer, affords a much greater number of windings than in the motor-coil $f$, and hence the current produced and delivered from the commutator $f'$ will be of a higher potential proportioned to the difference in the cross-section of the wire and number of windings in the two coils. In accomplishing this end the heads $c$ and $c'$ may be composed of either magnetic or diamagnetic metal if direct or smooth currents are to be converted from low to high potential. If the machine is to be restricted to converting smooth or direct currents, the casing may be composed of cast-iron, as in certain other of my prior electric motors or generators; but if alternating currents are to be converted the skeletonized or laminated feature is of special value, and the heads $c$ and $c'$ of the casing should then be composed of diamagnetic metal, as will be more specially hereinafter described.

The machine shown in Fig. 2 is specially organized for converting currents of high to low potential, and although it will operate equally well whether the currents be smooth or alternating, it is specially organized to operate in connection with the alternating variety, and therefore it is to be understood that the heads $c$ and $c'$ are composed of diamagnetic metal, but otherwise the casing is as before indicated. In this machine the exciting helix or helices B' are composed of much finer wire than that in the helix B of Fig. 1. The armature C has the two separate coils or windings $f$ and $g$ and appropriate commutators $f'$ and $g'$, as before described in connection with Fig. 1.

In the machine, Fig. 1, the coarse exciting-helix and the armature-coil would, as before indicated, be operated in series, but the helix B' of the machine, Fig. 2, being of fine wire, can best be operated in shunt from the fine armature coil or winding $f$. Now, when high-potential currents are applied to the commutator $g'$, the armature is rotated and currents of low potential are taken from the commutator $f'$, whether said currents be smooth or alternating, the changed currents differing only as to potentiality.

If electric energy be supplied from exterior sources to the exciting-helices, either machine may be used as a generator, affording separate currents of different potentialities. So, also, may either of the armature-coils be used to excite the helix, and the other coil employed in an external circuit.

Either machine can be operated as a motor, regardless of the particular character of current employed or to which of the two armature-coils the current may be applied, and in either case a current of opposite potentiality may be taken from the machine, and if power be applied to the armature-shaft both high and low potential currents will be afforded, none of these changes in the mode of working involving any changes in the machines.

It is not essential that the independent armature-coils should be concentric with each other, as I can readily arrange them in sections alternating with each other in the same plane on the armature under a novel system of armature-winding disclosed in my application for Letters Patent filed May 11, 1887, Serial No. 237,862.

It should be distinctly understood that for converting smooth or direct currents from high to low or low to high potentiality fairly good results will accrue if the armature with its two or more independent coils or windings of different sizes be employed in connection with either of the arrangements of inclosing-shell and exciting-helix disclosed in my aforesaid Letters Patent No. 358,340, and hence I do not limit certain features of my invention to the employment of the laminated shell, nor to a helix which diametrically surrounds the armature. So, also, is it to be understood that if the two sets of armature-windings be of the same-sized wire, but of unequal lengths, they will serve for converting currents, and, further, that the laminated magnetic cylinder having the diamagnetic heads will be found of special value in connection with alternating currents regardless of the character of the armature or its winding, and especially so if the armature-core be a laminated structure embodying magnetic metal plates.

Having thus described my invention, I claim as new and desire to secure by Letters Patent—

1. The combination, substantially as hereinbefore described, of an armature having a core of magnetic metal, independent coils or windings thereon, a separate commutator for each of said coils or windings, an exciting-helix surrounding and directly polarizing said armature, and a magnetic shell which incloses said helix and armature.

2. The combination, substantially as hereinbefore described, of an armature having a core of magnetic metal, a coil or winding thereon composed of coarse wire, and a second coil or winding which is independent of the other and composed of finer wire, separate commutators for each winding, an exciting-helix surrounding and directly polarizing said armature, and a magnetic shell inclosing said helix and armature.

3. The combination, substantially as hereinbefore described, of an armature having a core of magnetic metal, a coil or winding thereon composed of coarse wire, and a second independent coil or winding composed of finer wire, separate commutators for each winding, an exciting-helix surrounding said armature diametrically for directly polarizing it, and a laminated shell inclosing said helix and armature.

4. The combination, substantially as hereinbefore described, of an internally-cylindrical laminated shell composed of plates of magnetic metal, heads for said shell, composed of diamagnetic metal, an armature having a magnetic core and independent coils or windings thereon composed, respectively, of fine wire and coarse wire, a separate commutator for each coil or winding, and an exciting-helix which surrounds said armature diametrically and directly polarizes it and is inclosed by said cylindrical laminated shell.

5. The combination, substantially as hereinbefore described, of an armature having a laminated core of magnetic metal and carrying independent coils or windings, one being of finer wire than the other, a separate commutator for each of said coils, an exciting-helix surrounding said armature diametrically, and a laminated magnetic shell inclosing said helix and armature and provided with heads composed of diamagnetic metal.

6. The combination, substantially as hereinbefore described, of an armature having a core of magnetic metal, an exciting-helix which surrounds said armature diametrically and directly polarizes the same, and a shell having diamagnetic heads and a laminated cylinder of magnetic metal which incloses said helix and armature.

RUDOLF EICKEMEYER.

Witnesses:
EDWARD P. MOFFAT,
HENRY OSTERHELD.